United States Patent

Takahashi

[11] 3,848,500
[45] Nov. 19, 1974

[54] REGISTERING DEVICE FOR GAPS TO BE FORMED IN A SLIDE FASTENER CHAIN

[75] Inventor: Kihei Takahashi, Uozu, Japan

[73] Assignee: Yoshida Kogy Kabushiki Kaisha, Tokyo, Japan

[22] Filed: Dec. 3, 1973

[21] Appl. No.: 421,110

[30] Foreign Application Priority Data
Dec. 6, 1972 Japan.................. 47-140020[U]

[52] U.S. Cl................ 83/465, 29/207.5 D, 83/251, 83/282, 83/418, 83/921
[51] Int. Cl............................................. B26d 7/02
[58] Field of Search ............ 83/465, 921, 251, 282, 83/418; 29/207.5 D, 207.5 R, 427, 408

[56] References Cited
UNITED STATES PATENTS

| 2,798,549 | 7/1957 | Feitl.................................. 83/921 X |
| 2,836,239 | 5/1958 | Johns et al......................... 83/921 X |
| 3,611,538 | 10/1971 | Takamatsu..................... 29/207.5 D |

Primary Examiner—Frank T. Yost
Attorney, Agent, or Firm—Robert E. Burns; Emmanuel J. Lobato; Bruce L. Adams

[57] ABSTRACT

A gap registering device is disclosed for adjusting a length of fastener elements to be cut in a position registering with a cutting tool such that there will be produced no undesirable element debris on either side of the resulting gap in a slide fastener chain. The device includes spring-loaded clamping means for holding and compressing a length of fastener elements so that endmost ones of the elements are brought into precise registry with the path of a vertically movable cutting tool.

2 Claims, 7 Drawing Figures

PATENTED NOV 19 1974 3,848,500

REGISTERING DEVICE FOR GAPS TO BE FORMED IN A SLIDE FASTENER CHAIN

BACKGROUND OF THE INVENTION

This invention relates to an apparatus for removing a length of continuous interlocking fastener elements from a slide fastener chain to provide therein alternate element-containing and element-free sections, and has particular reference to a device operatively associated with such apparatus for registering the fastener chain with reference to the path of a cutting tool.

Various apparatus for providing such element-free sections or gaps in a continuous fastener chain are known, and they typically comprise a guide table on which the fastener chain travels and a vertically disposed cutting punch and die unit supported from the table for cutting gaps at predetermined intervals in the chain which is transported intermittently by a feeding unit in a horizontal direction. Due to operating errors of the feeding unit, aggregated errors in the fastener element pitch or the fastener tapes being locally elongated or shrinked, the fastener chain cannot always be brought to a stop at the proper position in which a length of its elements corresponding to a gap to be formed register precisely with the cutting punch or die. This is also because the fastener elements have their interengaged head portions normally shifted out of position longitudinally of the fastener chain by a maximum of one element pitch. If the chain was processed for gap formation under such element conditions, the results would be that terminal elements at either or both ends of the gap are cut only partly away, with uncut debris interfering with a subsequent finishing operation.

Means have been proposed for eliminating the above difficulties, and such means are generally provided only at one side of the cutting punch and are operated in interlocked relation to the cutting punch such that the fastener chain is moved a small distance additionally, after it has been stopped, so as to adjust the position of the chain relative to the punch, the arrangement being that the fastener elements are pushed or pulled from one end of the chain. This arrangement, however, is not satisfactory in that the fastener elements at the opposite end of the chain cannot always be adjusted to register with the punch. This is more so with varying lengths of elements which are to be cut to produce the desired gaps.

SUMMARY OF THE INVENTION

Whereas, it is the primary object of the present invention to provide an improved device for registering a slide fastener chain with reference to a cutting tool in such a manner that a particular group or length of fastener elements to be cut can be located precisely within the path of the tool, thereby eliminating the tendency of an element or elements in that particular group being cut half or partly away.

This and other objects and features of the invention will be better understood from the following detailed description of a preferred embodiment taken in conjunction with the accompanying drawings.

DESCRIPTION OF THE PREFERRED EMBODIMENTS

Figure 1:
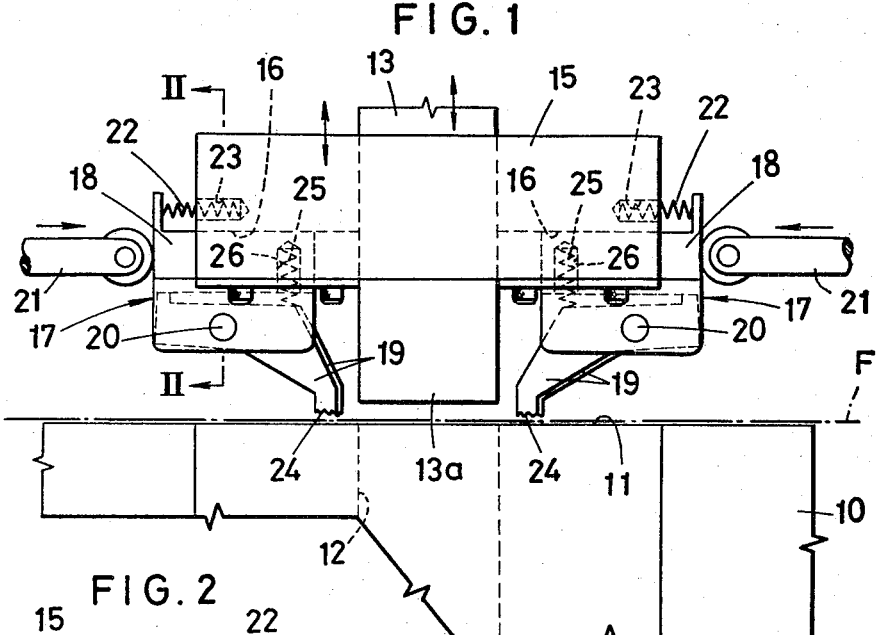
FIG. 1 is a front elevation of a registering device according to the invention.
Figure 2:
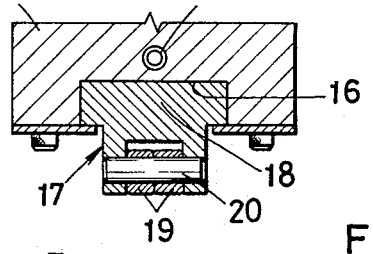
FIG. 2 is a cross-sectional view taken on the line II—II of FIG. 1.
Figure 3:
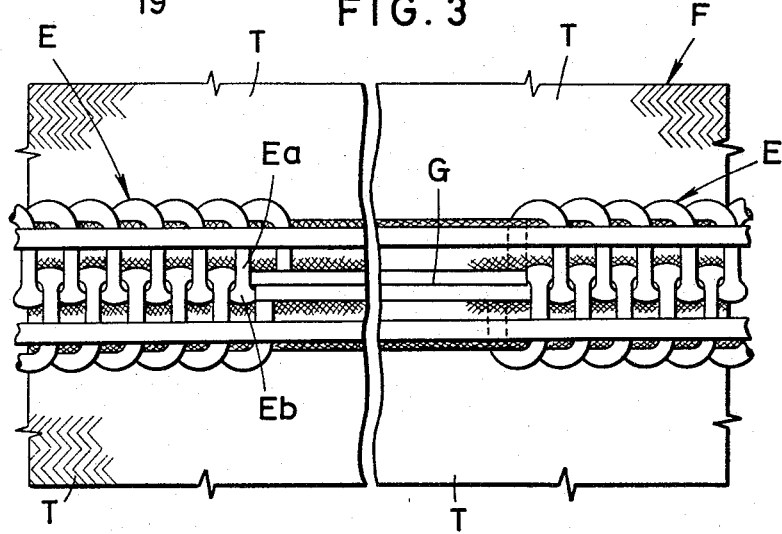
FIG. 3 is a plan view on enlarged scale of a segment of a slide fastener chain having formed therein an element-free section or gap.

Referring now to the drawings and FIG. 1 in particular, there is shown a supporting table 10 having a guide surface 11 along which a slide fastener chain F is transported intermittently in a horizontal direction by means of a suitable chain feeding unit (not shown). The chain F consists of a pair of stringer tapes T,T each carrying a row of continuous coil elements E as is well known. A cutting die 12 is provided in the table 10 for cooperation with a vertically movable cutting punch 13 in cutting a length of fastener elements to form a gap G in the fastener chain F. This cutting punch and die arrangement is well known, and functions to cut the fastener elements in their interengaged head portions, whereupon the remaining element debris Ed including their leg and connecting portions are removed by a pair of grippers 14 (FIG. 6) which are movable sidewise into and away from the path of the fastener chain. This does not constitute part of the invention and hence need not be further described.

The cutting punch 13 is vertically movable with or in interlinked relation to a supporting block 15 which may be connected to a suitable driving means not shown. The block 15 is provided in its opposite sides with horizontally elongated recesses 16 for accommodating a gap registering device embodying the invention.

Figure 5:
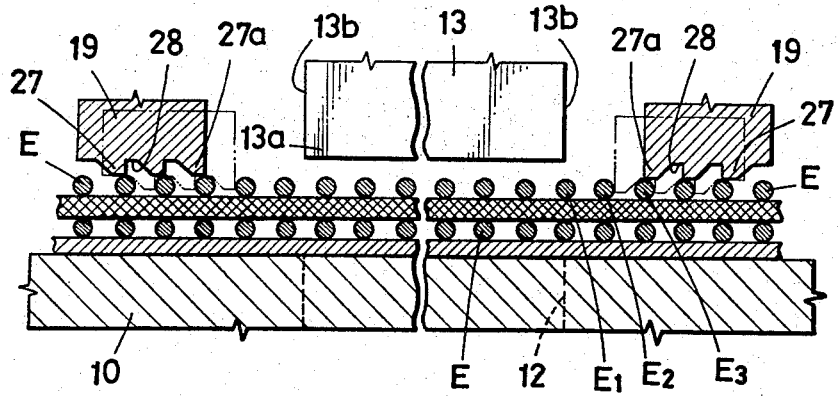
FIG. 5 is a longitudinal cross section along the line V—V of FIG. 4.

The gap registering device generally designated 17 comprises a pair of carriages 18 movably journalled in the recesses 16 and each carrying a clamping arm 19 pivotally connected thereto by a pin 20 and located on opposite sides of the punch 13, and actuating levers 21 for moving the carriages 18 horizontally inwardly towards each other within the recesses 16 relative to the block 15 in the direction of the arrows as shown in FIG. 1. Each carriage 18 is normally urged away from the cutting punch 13 by means of a first compression spring 22 interposed between the carriage 18 and block 15 and accommodated in a horizontal bore 23 in the block 15. Each arm member 19 has a downwardly directed toothed end 24 which is normally urged downwardly towards the path of the chain F by means of a second compression spring 25 vertically disposed in a bore 26 in the block 15. The toothed end 24 of each pivotal arm 19 is provided with alternate ridges 27 and grooves 28 which ridges are dimensioned to fit into the spaces between individual adjacent fastener elements E and which grooves to receive the leg portions Ea of the elements E, as better shown in FIGS. 5 and 7.

Figure 4:
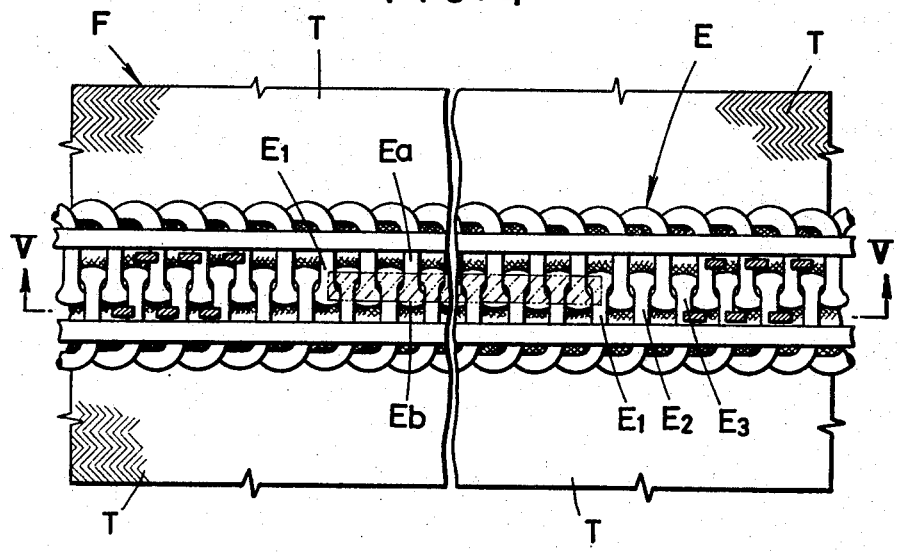
FIG. 4 is a plan view on enlarged scale of the fastener chain shown in a position relative to the cutting tool prior to gap-forming operation.

Assuming that the fastener chain F has advanced a predetermined length along the table 10 and has come to a stop at the position indicated in FIG. 4, it will be seen that the endmost elements $E_1$ in that length which is to be cut are out of registry with the cutting punch 13 as indicated in hatched chain lines in FIG. 4. More specifically, half or part of these endmost elements $E_1$ are displaced from the path of the punch 13 so that when the punch 13 cuts through the interengaged head portions $Eb$ in this position, there will be produced half-cut debris on the elements $E_1$ on opposite sides of the resulting gap in the chain F. In order to avoid this, the registering device 17 according to the invention operates in the manner following.

Figure 6:
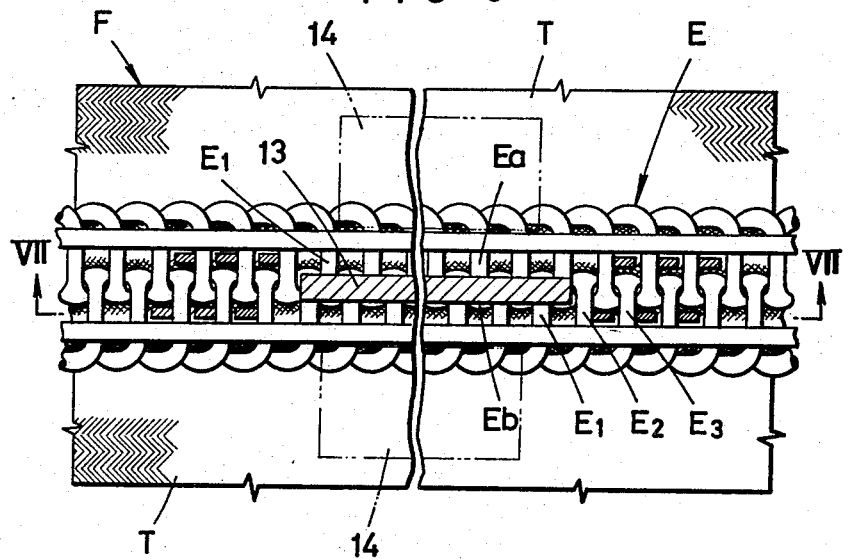
FIG. 6 is a view similar to FIG. 4, but showing the fastener chain in adjusted position relative to the cutting tool, and ready for gap-forming operation.
Figure 7:
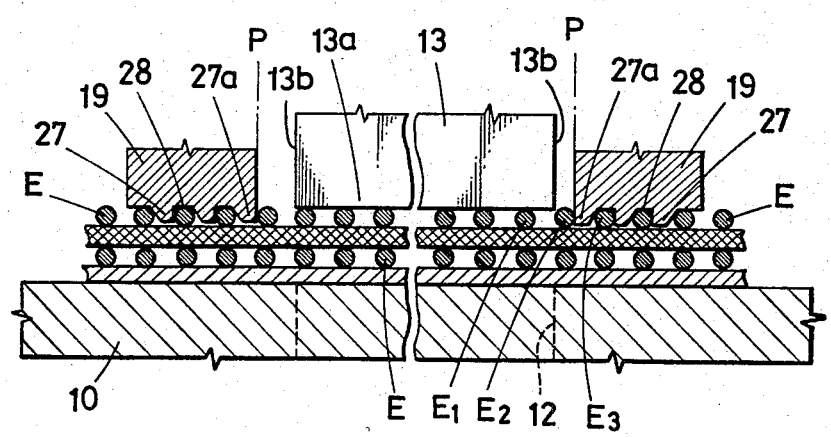
FIG. 7 is a longitudinal cross section along the line VII—VII of FIG. 6.

The registering device 17 is arranged to act upon the fastener chain F prior to arrival of the bladed edge 13a of the cutting punch 13 at the surface of the chain F. The supporting block 15 is lowered until the toothed end 24 of each arm 19 lands on some of the fastener elements E adjacent that length of elements which are to be cut. More specifically, the innermost ridge 27a of the clamping arm 19 is brought into abutting engagement with the third element $E_3$ counting from that element $E_1$ which is likely to be cut erroneously in part. At which instance, or simultaneously with this, the carriages 18 are moved slightly inwardly by the actuating levers 21 against the tension of spring 22 so taht the ridge 27a on each arm 19 moves from the third element $E_3$ and snaps into the space between the element $E_3$ and the second element $E_2$ next to the endmost element $E_1$ under the influence of spring 25 as indicated in chain-dotted lines in FIG. 5. The carriages 18,18 are further moved inwardly towards the cutting punch 13 until either of the carriages approaches approximately one-half or one element pitch with respect to the respective side edge 13b as shown in FIG. 7. This pitch could be even one and half, defining the final position of the carriages 18,18 relative to the cutting punch 13 wherein the possibility of fastener elements E being half or partly cut can be eliminated. In that position of the carriages 18,18 the arms 19 push the fastener elements E compressively from both sides until the third elements $E_3$ are shifted inwardly by the ridges 27 to the point P at which the endmost elements $E_1$ are admitted completely into the path of the cutting punch 13, as best shown in FIGS. 6 and 7. In this manner, the registering device 17 ensures that terminal fastener elements $E_1, E_1$ lying at opposite sides of a gap to be formed will be cut completely away without leaving any uncut debris. Upon completion of each cycle of gapforming operation, the block 15 is lifted, so are the carriages 18,18, releasing the clamping arms 19 from the fastener chain F. The actuating levers 21 are then retracted so that the carriages 18 are urged by the respective springs 22 back to the initial position indicated in FIG. 1.

Having thus described the invention, it will be understood that the invention is not to be limited to the precise form and construction herein advanced and illustrated, but various changes may be made therein without departing from the scope of the appended claims.

What is claimed is:

1. A registering device for gaps to be formed in a slide fastener chain having rows of continuous fastener elements and intermittently transported in a horizontal plane, which device comprises in combination with a cutting tool:
   a. a vertically movable supporting block;
   b. a pair of carriages mounted movably in said block and positioned on opposite sides of the cutting tool;
   c. a pair of clamping arms pivotally connected to the respective carriages and adapted to compress a length of fastener elements inwardly adjacent the cutting tool;
   d. actuating means for moving said carriages horizontally inwardly toward each other relative to the cutting tool;
   e. a first spring means interposed between said block and each of said carriages and normally urging the latter away from the cutting tool; and
   f. a second spring means adapted to urge said clamping arm normally toward the plane of the fastener chain.

2. The registering device as claimed in claim 1 wherein said clamping arm is provided with a toothed end dimensioned to fit into the spaces between the leg portions of adjacent individual fastener elements.

* * * * *